United States Patent
Shieh et al.

(10) Patent No.: US 9,171,373 B2
(45) Date of Patent: Oct. 27, 2015

(54) SYSTEM OF IMAGE STEREO MATCHING

(71) Applicants: NCKU RESEARCH AND DEVELOPMENT FOUNDATION, Tainan (TW); HIMAX TECHNOLOGIES LIMITED, Tainan (TW)

(72) Inventors: Ming-Der Shieh, Tainan (TW); Der-Wei Yang, Tainan (TW); Li-Chia Chu, Tainan (TW); Tzung-Ren Wang, Tainan (TW)

(73) Assignees: NCKU Research and Development Foundation, Tainan (TW); Himax Technologies Limited, Tainan (TW)

( * ) Notice: Subject to any disclaimer, the term of this patent is extended or adjusted under 35 U.S.C. 154(b) by 201 days.

(21) Appl. No.: 13/727,471

(22) Filed: Dec. 26, 2012

(65) Prior Publication Data

US 2014/0177927 A1    Jun. 26, 2014

(51) Int. Cl.
 *G06K 9/00* (2006.01)
 *G06T 7/00* (2006.01)
(52) U.S. Cl.
 CPC ..... *G06T 7/0075* (2013.01); *G06T 2207/10012* (2013.01)
(58) Field of Classification Search
 None
 See application file for complete search history.

(56) References Cited

U.S. PATENT DOCUMENTS

| 8,774,512 | B2* | 7/2014 | Yao et al. | 382/173 |
| 2009/0324059 | A1* | 12/2009 | Boughorbel | 382/154 |
| 2010/0134496 | A1* | 6/2010 | Bhaskaran et al. | 345/428 |
| 2011/0026809 | A1* | 2/2011 | Jeong et al. | 382/154 |
| 2011/0210965 | A1* | 9/2011 | Thorpe | 345/419 |
| 2011/0261050 | A1* | 10/2011 | Smolic et al. | 345/419 |
| 2012/0237114 | A1* | 9/2012 | Park et al. | 382/154 |
| 2013/0129194 | A1* | 5/2013 | Gusis et al. | 382/154 |
| 2013/0155050 | A1* | 6/2013 | Rastogi et al. | 345/419 |
| 2013/0170736 | A1* | 7/2013 | Guo et al. | 382/154 |
| 2013/0222377 | A1* | 8/2013 | Bruls et al. | 345/419 |
| 2014/0003704 | A1* | 1/2014 | Liao et al. | 382/154 |
| 2014/0049612 | A1* | 2/2014 | Ishii | 348/46 |

FOREIGN PATENT DOCUMENTS

WO    WO2012059841 A    *  5/2012    ............ H04N 13/00

* cited by examiner

*Primary Examiner* — Bhavesh Mehta
*Assistant Examiner* — Oneal R Mistry
(74) *Attorney, Agent, or Firm* — Donald E. Stout; Stout, Uxa & Buyan, LLP

(57) ABSTRACT

A system of image stereo matching includes at least one stereo matching unit (SMU) each receives a first view and a second view of a view pair, according to which the SMU generates a first depth map for the first view. The system also includes a backward tracer operable to receive the first depth map, according to which a second depth map for the second view is derived.

11 Claims, 4 Drawing Sheets

SYSTEM OF IMAGE STEREO MATCHING

BACKGROUND OF THE INVENTION

1. Field of the Invention

The present invention generally relates to 3D imaging, and more particularly to a system of stereo matching with an adaptive window size.

2. Description Of Related Art 3D imaging is a technique for creating, enhancing or recording the illusion of depth in an image by means of two offset images, i.e., a left image and a right image, which are combined, in the brain of a viewer to give the perception of 3D depth.

Stereo matching technique is a major concern in many applications such as stereo 3D adjustment, multi-view rendering and free view point system. FIG. 1 shows a block diagram illustrating a conventional system 100 of image stereo matching for two-view applications. As shown in FIG. 1, two stereo matching units (SMUs) 11A and 11B are used to obtain depth maps respectively for a left (L) image and a right (R) image. As the SMUs 11A and 11B are calculation intensity, they thus occupy large circuit area or incur great latency.

Moreover, in the conventional system of stereo matching, a matching window for performing the stereo matching generally has a fixed square window size. If the window size is set small, a noisy depth map may ordinarily be obtained. On the other hand, if the window size is set large, a depth map with blurred boundary may usually be obtained.

For the foregoing reasons, a need has arisen to propose a novel system of image stereo matching to overcome deficiencies of the conventional 3D system.

SUMMARY OF THE INVENTION

In view of the foregoing, it is an object of the embodiment of the present invention to provide a system of image stereo matching that has reduced circuit area and latency, and/or improved depth map by using adaptive window size.

According to one embodiment, a system of image stereo matching includes at least one stereo matching unit (SMU) and a backward tracer. Each SMU is operable to receive a first view and a second view of a view pair, according to which the SMU is configured to generate a first depth map for the first view. The backward tracer is operable to receive the first depth map, according to which a second depth map for the second view is derived.

DETAILED DESCRIPTION OF THE INVENTION

Figure 1:
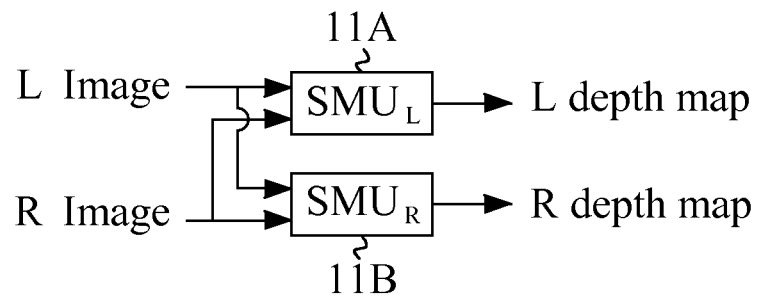
FIG. 1 shows a block diagram illustrating a conventional system of image stereo matching for two-view applications.
Figure 2:
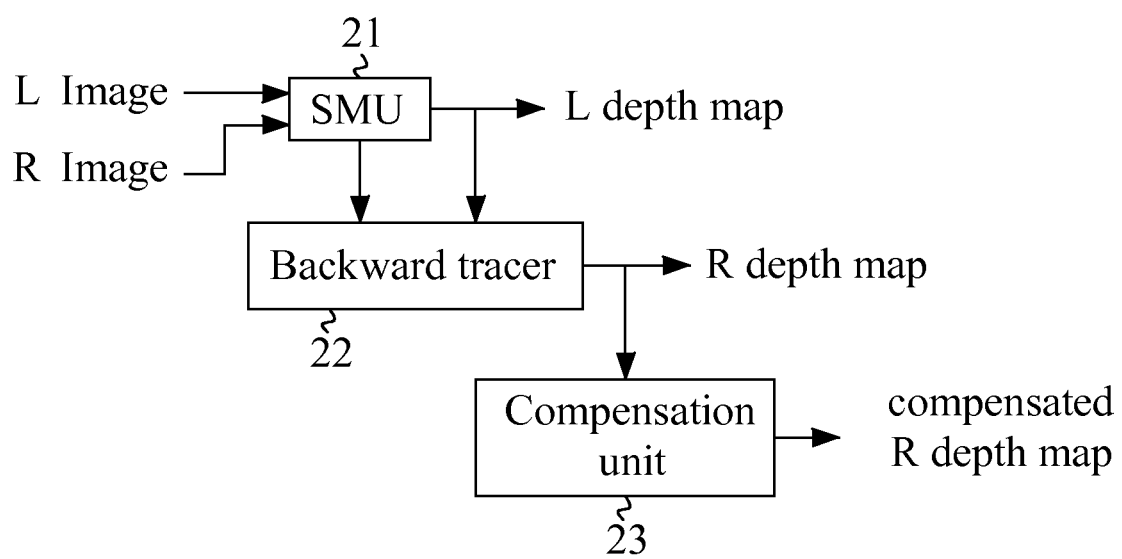
FIG. 2 shows a block diagram illustrating a system of image stereo matching according to one embodiment of the present invention.

FIG. 2 shows a block diagram illustrating a system 200 of image stereo matching according to one embodiment of the present invention. Although a two-view (i.e., left view and right view) architecture is illustrated here, it is appreciated that the embodiment, in general, may be well adapted to a multi-view application. The disclosed system 200 may either be implemented in an integrated circuit, or be performed in a digital image processor (DSP).

Figure 3:
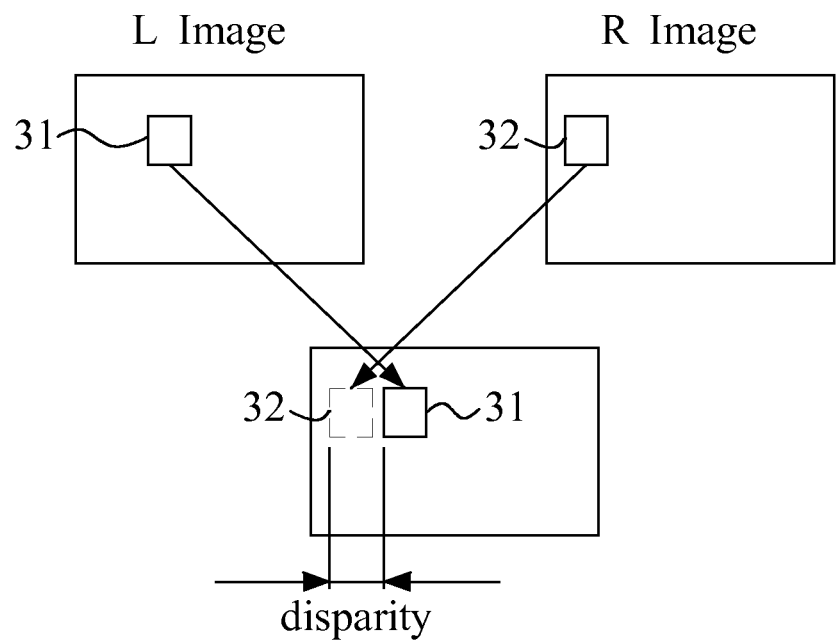
FIG. 3 demonstrates generation of a depth map for the right image.

As shown in FIG. 2, the system 200 includes a stereo matching unit (SMU) 21 that is operable to receive a left (L) image and a right (R) image, according to which the SMU 21 is then configured to generate a depth map for the left image (or, in general, a first depth map for a first view in a multi-view application). In the embodiment, the depth map may be generated by determining similarity metrics, such as a sum of absolute differences (SAD), between matching windows of the left image and the right image. As exemplified in FIG. 3, when a minimum SAID between a matching window 31 in the left (L) image and a corresponding matching window 32 in the right (R) image is determined, a disparity with respect to the matching windows 31 and 32 is thus obtained. Performing the similarity determination by moving the matching windows 31 and 32 throughout an entire frame, the depth map for the left image may thus be generated. In the embodiment, the matching window refers to image pixels of an image area in the left image or the right, image that the SMU 21 currently receives and processes.

Referring back to FIG. 2, the system 200 includes a backward tracer 22 that is operable to receive the disparity and the left depth map, according to which a depth map for the right image, i.e., right depth map (or, in general, a second depth map for a second view in the multi-view application) may then be derived. Specifically, depth data of the depth map for the left image are mapped (or backward traced) to corresponding matching windows displaced with the corresponding disparities in the right image respectively, therefore deriving the depth map for the right image. As calculation-intensive SAD is no longer performed in the embodiment for obtaining the depth map for the right image, a substantial amount of circuit area can be reduced (that is, a SMU for the right image may be omitted) and processing speed can be dramatically increased.

It is observed that sometimes not all pixels in the right image can find a matched depth value. As a result, some hole regions may exist in the derived right depth map. It is therefore according to another aspect of the embodiment that the system 200 may further include a compensation unit 23 configured to fill or mend at least one hole region in the right depth map, resulting in a compensated right depth map. In one exemplary embodiment, interpolation may be adopted to construct a depth value for the hole region (particularly a thin hole region) based on depth values of neighboring regions. For example, the depth values of the neighboring regions surrounding the hole region are averaged as the constructed depth value to fill the hole region. In another exemplary embodiment, extrapolation may be adopted to construct a depth value for the hole region (particularly a wide hole region) based on depth values of a neighboring region. For example, the depth value of the neighboring region may be used as the constructed depth value to fill the hole region.

Figure 4:
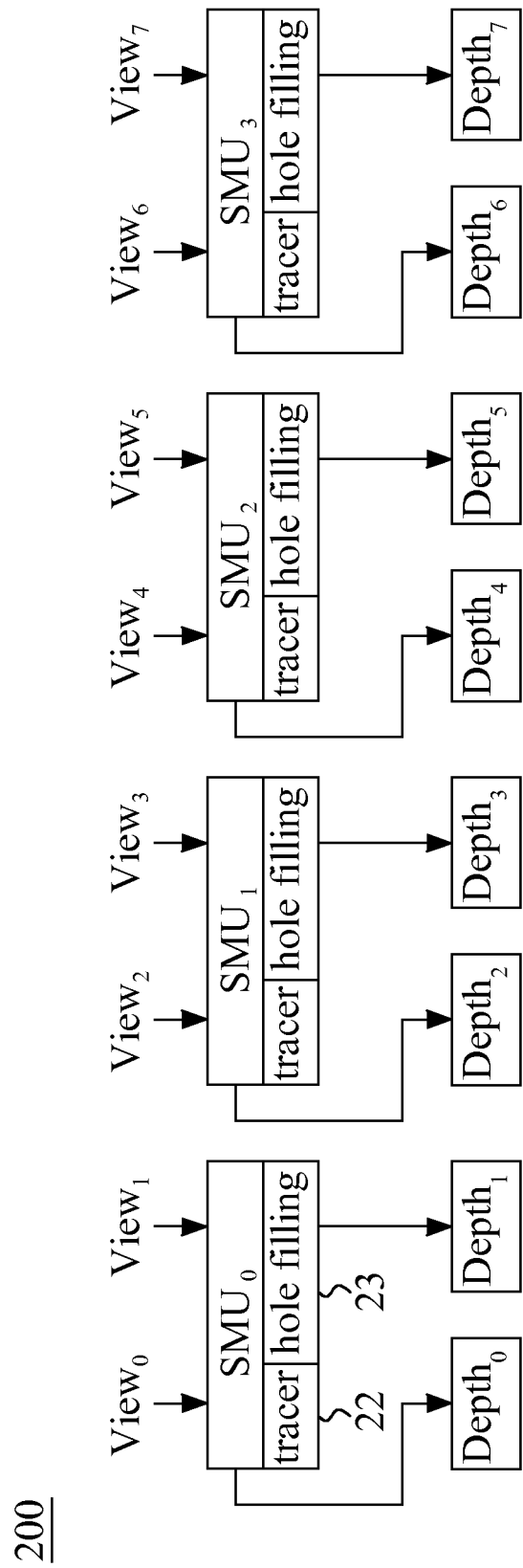
FIG. 4 shows a block diagram illustrating a system of image stereo matching for a multi-view application.

The embodiment for the two-view application as discussed above may be adapted to a multi-view application as exemplified in FIG. 4. In the example, each view pair of two views (or images), e.g., $View_0$ and $View_1$, is processed by a single dedicated SMU 21 (e.g., $SMU_0$) to generate a first depth map (e.g., $Depth_0$) for a first view of the two views and derive a second depth map (e.g., $Depth_1$) for a second view of the two views. Similarly, other view pairs (e.g., $View_2$-$View_3$, $View_4$-$View_5$, and $View_6$-$View_7$ may be processed by dedicated $SMU_1$-$SMU_3$ respectively, to generate first depth maps (e.g., $Depth_2$, $Depth_4$ and $Depth_6$) and derive second depth maps (e.g., $Depth_3$, $Depth_5$ and $Depth_7$).

Figure 5:
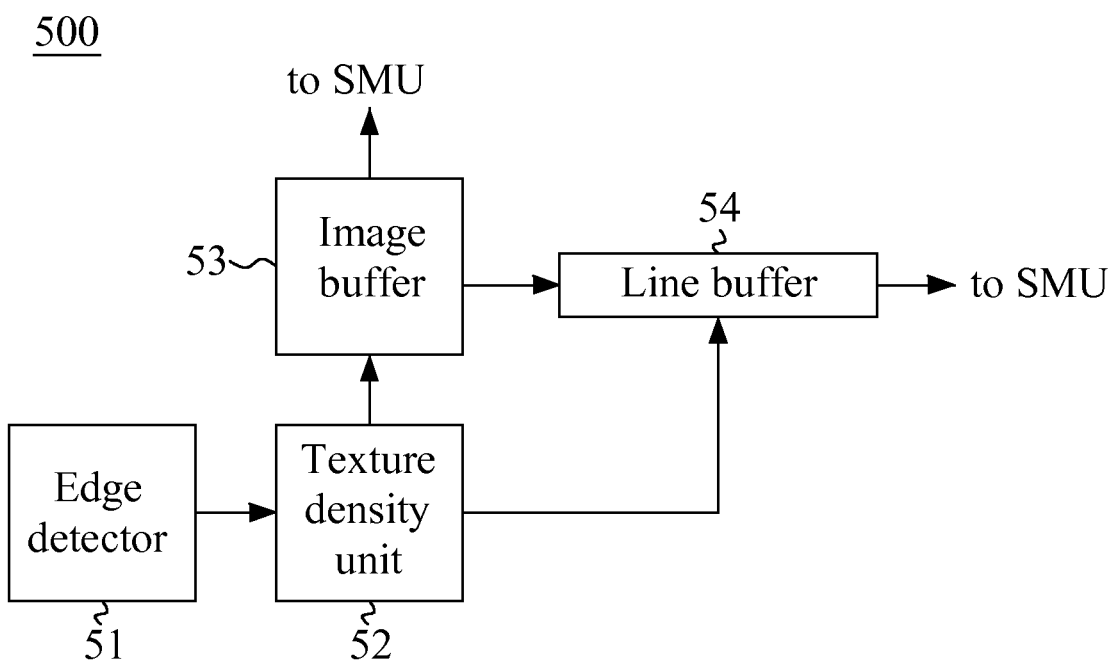
FIG. 5 shows a block diagram illustrating a system of providing left image with adaptive window size to the SMU of FIG. 2 according to one embodiment of the present invention.

According to a further aspect of the embodiment, a size of the matching window as mentioned above may be adaptively or dynamically changed according to texture density of the left image. FIG. 5 shows a block diagram illustrating a system 500 of providing left image with adaptive window size to the SMU 21 (FIG. 2) according to one embodiment of the present invention. In the embodiment, the system 500 includes an edge detector 51, such as a Sobel filter, configured to obtain edge information of the left image. Based on the edge information, a texture density unit 52 is used to determine a window size by comparing the edge information with at least one density threshold.

In an example, a local histogram of an edge map obtained from the edge detector 51 is provided to the texture density unit 52, therefore resulting in a texture density. The resultant texture density is then compared with three density threshold values, e.g., a first density threshold, a second density threshold and a third density threshold, in an order from small to large. In a case that the texture density is larger than the first density threshold but less than the second density threshold, a large window size, e.g., a 7×7 window, is allocated. In a case that the texture density is larger than the second density threshold but less than the third density threshold, a medium window size, e.g., a 5×5 window, is allocated. In a case that the texture density is larger than the third density threshold, a small window size, e.g., a 3×3 window, is allocated. Generally speaking, the larger the resultant texture density is, a matching window with a smaller size is allocated. According to the allocated window size, image pixel values stored in an image buffer 53 bound by the allocated window size are forwarded to the SMU 21 (FIG. 2) for processing. Although square windows are exemplified above, it is appreciated that rectangular windows may be generally used instead.

According to a further aspect of the embodiment, in a case that the texture density is less than the first density threshold, indicating a smooth region around the matching window, the image pixel values originally stored in the image buffer 53, e.g., of the large window size, are regrouped in a line buffer 54. The image pixel values regrouped in the line buffer 54 (instead of the image buffer 53) are then forwarded to the SUM 21 for processing.

Although specific embodiments have been illustrated and described, it will be appreciated by those skilled in the art that various modifications may be made without departing from the scope of the present invention, which is intended to be limited solely by the appended claims.

What is claimed is:

1. A system of image stereo matching, comprising:
   at least one stereo matching unit (SMU) each being operable to receive a first view and a second view of a view pair, according to which the SMU is configured to generate a first depth map for the first view;
   a backward tracer operable to receive the first depth map, according to which a second depth map for the second view is derived by mapping depth data of the first depth map to a corresponding matching window displaced with corresponding disparity in the second view, the second depth map being derived by the backward tracer without using image data of the first view and the second view, wherein the first depth map is generated by determining similarity metrics between matching windows of the first view and the second view by the SMU, and the matching window has a size that is dynamically changed according to texture density of the first view;
   an image buffer configured to store image pixel values;
   an edge detector configured to obtain edge information of the first view; and
   a texture density unit configured to determine a window size of the matching window by comparing the edge information with at least one density threshold.

2. The system of claim 1, wherein the first view and the second view comprise a left image and a right image, respectively.

3. The system of claim 1, wherein the similarity metrics comprise a sum of absolute differences (SAD).

4. The system of claim 1, wherein the SMU further generates a disparity with respect to the matching windows.

5. The system of claim 1, further comprising a compensation unit configured to fill at least one hole region in the second depth map.

6. The system of claim 5, wherein the compensation unit performs interpolation to construct a depth value for the hole region based on depth values of neighboring regions in the second depth map.

7. The system of claim 5, wherein the compensation unit performs extrapolation to construct a depth value for the hole region based on depth values of a neighboring region in the second depth map.

8. The system of claim 1, wherein the edge detector comprises a Sobel filter.

9. The system of claim 1, wherein the edge information comprises a local histogram of an edge map, which is provided to the texture density unit, therefore resulting in a texture density that is then compared with the density threshold.

10. The system of claim 9, wherein the larger the resultant texture density is, a matching window with a smaller size is allocated, according to which the image pixel values stored in the image buffer bound by the allocated window size are forwarded to the SMU for processing.

11. The system of claim 9, further comprising a line buffer, into which the image pixel values stored in the image buffer are regrouped when the texture density is less than a predetermined density threshold indicating a smooth region.

* * * * *